United States Patent
Lapi

(10) Patent No.: US 7,017,715 B2
(45) Date of Patent: Mar. 28, 2006

(54) BRAKING SYSTEM ACTIVATED BY FLEXIBLE CABLE CONTROLS AND RELATIVE COMPONENTS

(76) Inventor: Enrico Lapi, Via Bellini, 11, S. Croce Sull'Arno (PI) (IT) 56029

( * ) Notice: Subject to any disclaimer, the term of this patent is extended or adjusted under 35 U.S.C. 154(b) by 0 days.

(21) Appl. No.: 10/486,800

(22) PCT Filed: Aug. 9, 2002

(86) PCT No.: PCT/IT02/00535

§ 371 (c)(1), (2), (4) Date: Feb. 13, 2004

(87) PCT Pub. No.: WO03/016125

PCT Pub. Date: Feb. 27, 2003

(65) Prior Publication Data

US 2004/0238291 A1 Dec. 2, 2004

(30) Foreign Application Priority Data

Aug. 13, 2001 (IT) .......................... PI2001A0057

(51) Int. Cl.
*B62L 1/06* (2006.01)

(52) U.S. Cl. .................... 188/24.11; 74/501.6; 74/502; 188/2 D; 188/24.16

(58) Field of Classification Search ............. 188/24.11, 188/24.16, 2 D; 74/501.6, 502.2, 502
See application file for complete search history.

(56) References Cited

U.S. PATENT DOCUMENTS

| 478,206 A | * | 7/1892 | Owen ...................... 188/24.11 |
| 5,927,442 A | | 7/1999 | Liao |

* cited by examiner

*Primary Examiner*—Matthew C. Graham
(74) *Attorney, Agent, or Firm*—Young & Thompson

(57) ABSTRACT

A braking system includes a central sprag, connected and perpendicular to the handlebar, projecting towards the front side of the cycle. At the end of the sprag, a terminal is inserted, free in rotation and equipped with two side holes in the lower part through which the flexible metal cable is inserted, which will be connected outside to the common levers activating the front and rear brakes of the vehicle. At the opposite end, on the contrary, the two lugs of the cable will be directly connected to the ends of the knobs of the handlebar. With the adjustment in length of the flexible cable connected to it, relating both to the front and rear braking device, activating one of the two cables placed in the front of the knobs of the handlebar will also pull the complementary cable by the rotation and consequent draw of the mobile central body, so getting a braking action also on the opposite wheel.

10 Claims, 6 Drawing Sheets

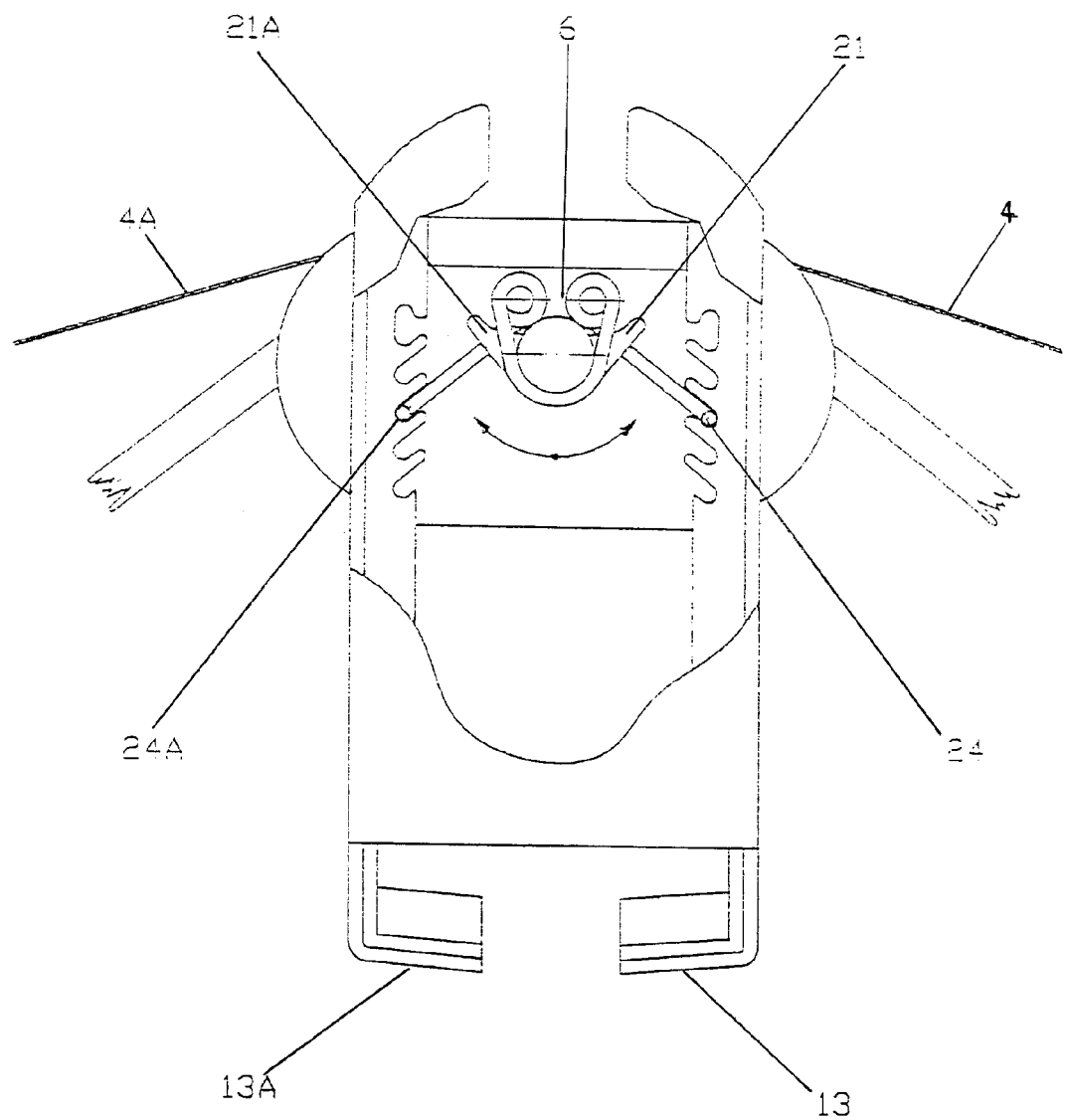

BRAKING SYSTEM ACTIVATED BY FLEXIBLE CABLE CONTROLS AND RELATIVE COMPONENTS

TECHNICAL FIELD

The present invention relates to the production of braking devices that include a flexible metal cable, largely used in the mass production of cycles, motorcycles and the like.

BACKGROUND ART

Known systems that control braking devices on cycles generally have two jaws that are forced by traction, by means of a lever system, to grip the suitable metal part of the spoke wheel by means of friction between the two braking terminals made of rubbery material. The two braking terminals are generally activated manually by two levers placed at the ends of the handlebar. The two levers are independent of each other and activate a respective flexible metal cable transmitting the movement to the respective_sets of jaws.

Such devices, regardless of their manufacturing quality, have the typical drawbacks of their double configuration: more pieces, more weight, more difficulty in their assembly and adjustment, as well as more difficulty keeping them in the best condition of efficiency and consequent safety. In addition, their traditional shape, even if aesthetically and ergonomically updated during time, makes their components possibly dangerous for the safety of the rider in the case of accidental spills because of their prominent ends. Another relevant drawback in the current systems is typical of their common shape, which makes their use ergonomically uncomfortable, usually giving the hand an unnatural hold, with the ring and little fingers often left out from the braking action because these are too far from the lever.

A further drawback is the independence of the two braking actions, front and/or back, which involves the difficulty, in the case of sudden necessity of braking, to keep control of the vehicle, since the action must be distributed on two brakes. Such an action is not always easy to be carried out by anyone in certain moments of danger: as a matter of fact, by acting only on the brake, either front or back, the rider runs the risk of becoming unstable. Said drawback is very important when the rider has a temporary or permanent handicap at one hand and cannot safely use the vehicle.

SUMMARY OF THE INVENTION

A braking system includes a central sprag, connected and perpendicular to the handlebar, projecting towards the front side of the cycle. At the end of the sprag, a terminal is inserted, free in rotation and equipped with two side holes in the lower part through which the flexible metal cable is inserted, which will be connected outside to the common levers activating the front and rear brakes of the vehicle. At the opposite end, on the contrary, the two lugs of the cable will be directly connected to the ends of the knobs of the handlebar. With the adjustment in length of the flexible cable connected to it, relating both to the front and rear braking device, activating one of the two cables placed in the front of the knobs of the handlebar will also pull the complementary cable by the rotation and consequent draw of the mobile central body, so getting a braking action also on the opposite wheel.

BRIEF DESCRIPTION OF THE DRAWINGS

The drawings are given as practical examples of the invention, but are not to be considered restrictive.

FIG. 18 shows a representation of the system in use. Exerting a force on one of the two cables (4, 4A), the central mobile element (6) freely rotates and transfers a similar traction on the opposite cable, causing both middle wheels brake. Said distribution, with simple alterations by deferments or buttonhole levers, may be possibly preset with different allocations. FIG. 18 also shows how the greater rotation angle of the central element is defined by the distance between the two projecting elements (21, 21A) and the two spirals of the spring; this means that it's possible to assess the maximum possible extension in each cable, beyond which the right or left projecting element of the pivot gets in touch with the right or left spiral of the spring causing the shift to the next notch on the opposite part of the central sprag.

DISCLOSURE OF INVENTION

Figure 1:
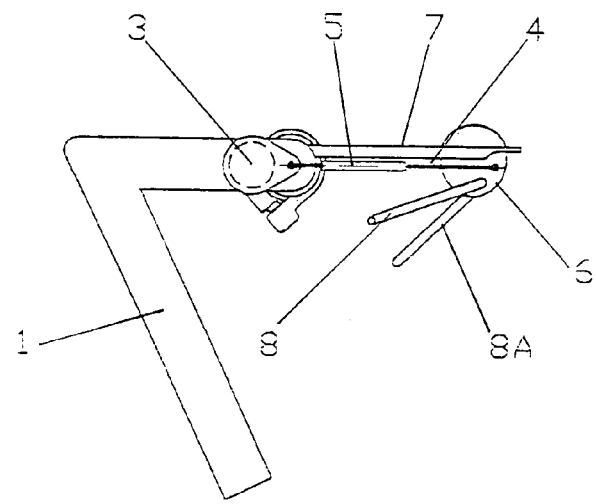
FIG. 1 shows the side view and FIG. 2 shows the front view of the invention. In particular, what is schematically depicted comprises the steering shaft (1) or handlebar (2), connected to the central sprag (7), supporting the central mobile element (6), where the boots (8, 8A) end, and the cables (4, 4A) that are fixed with their lugs to the ends of the knobs (3, 3A) connected to the handlebar. The side view (FIG. 1) particularly highlights the different angle of the boots outside, having a prefixed length, which direct the cables on the front (8A) and rear (8) brake.
Figure 2:
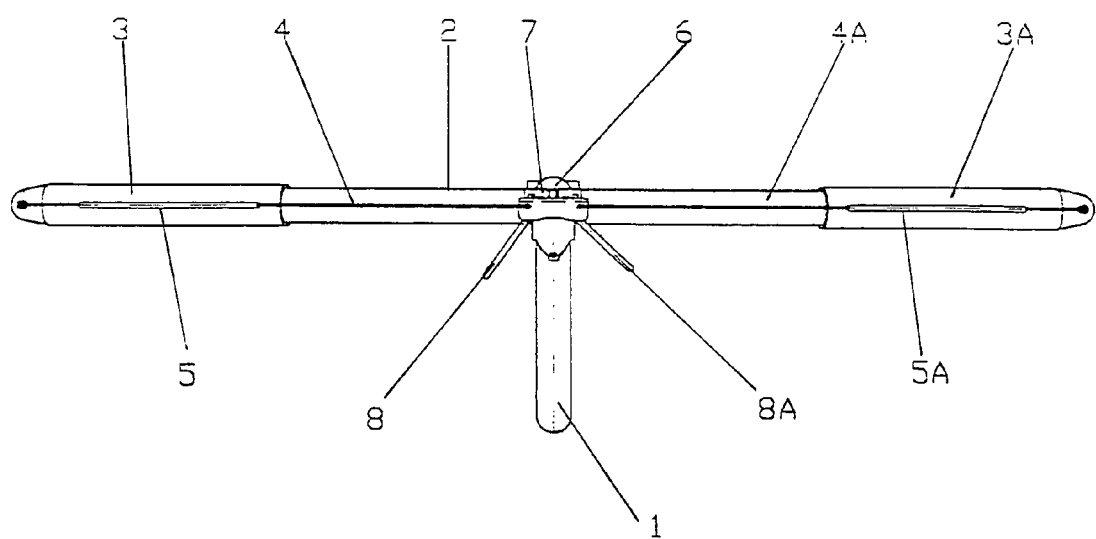
Figure 3:
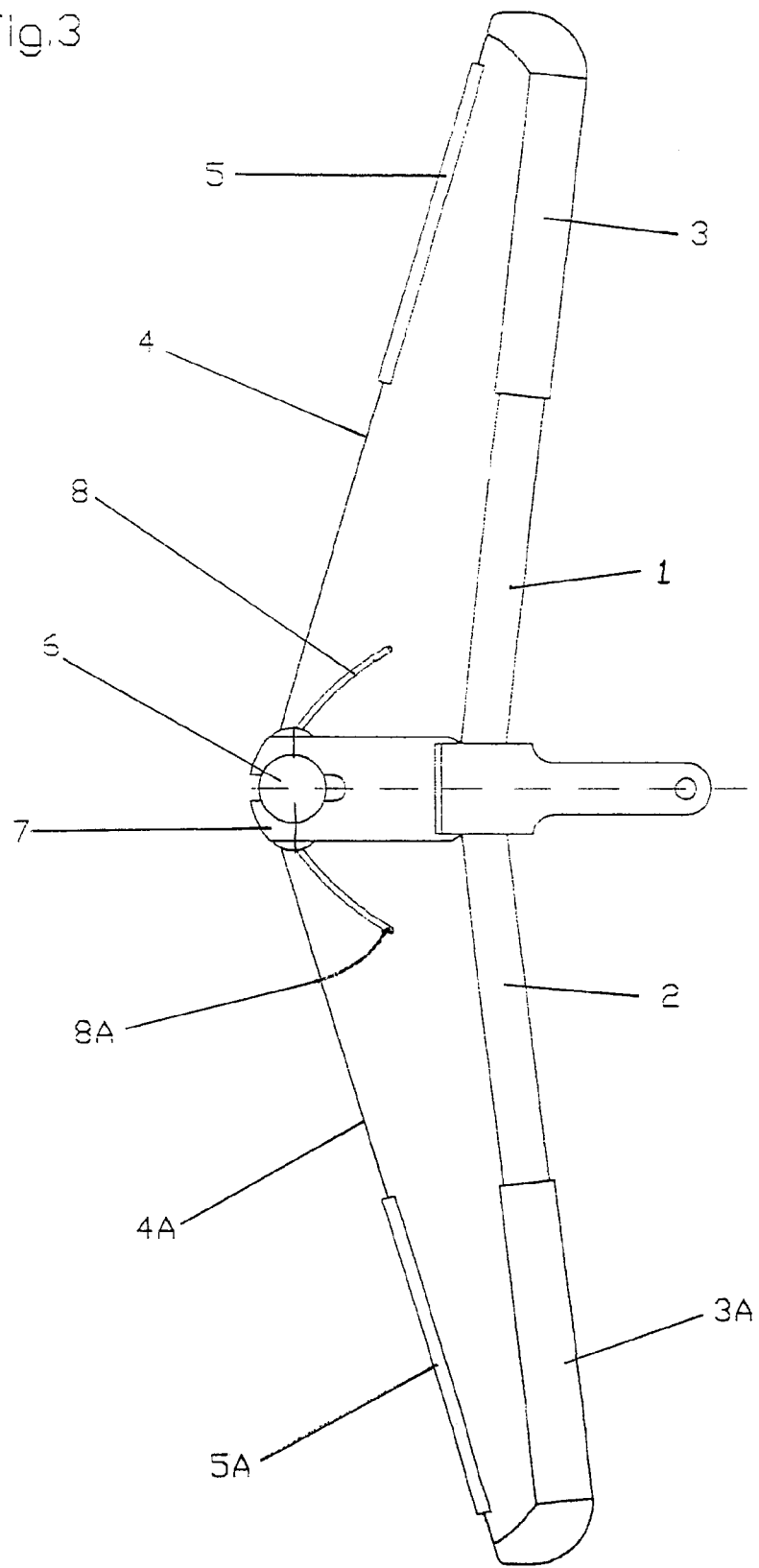
FIG. 3 is a top view of the system showing: the central sprag (7), locked between the steering shaft (1) and the handlebar (2); the central mobile element where the boots (8, 8A) end; the relative cables (4, 4A), equipped with protections for the fingers (5, 5A); the knobs (3, 3A) on the ends of which the lugs of the relative cables are fixed.
Figure 4:
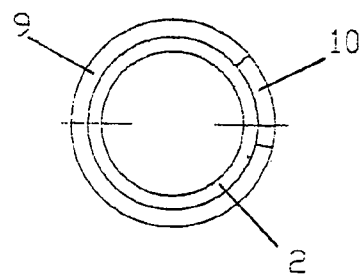
FIGS. 4, 5 and 6 show the central ring (9) connected to the handlebar (2) with the respective notches (10, 10A) set to hold the central sprag (7) (FIG. 6) that, thanks to the locking device created by the central conformation of the handlebar (1) allows its angular direction after locking of the screw (11).
Figure 5:
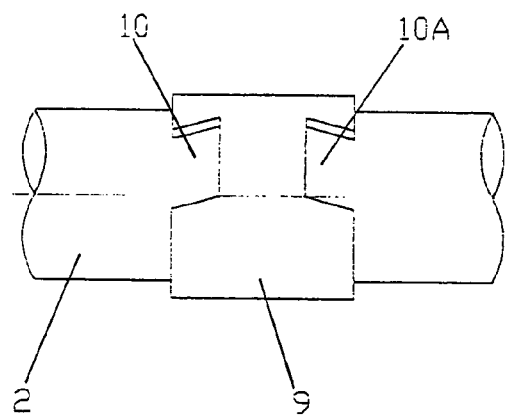
Figure 6:
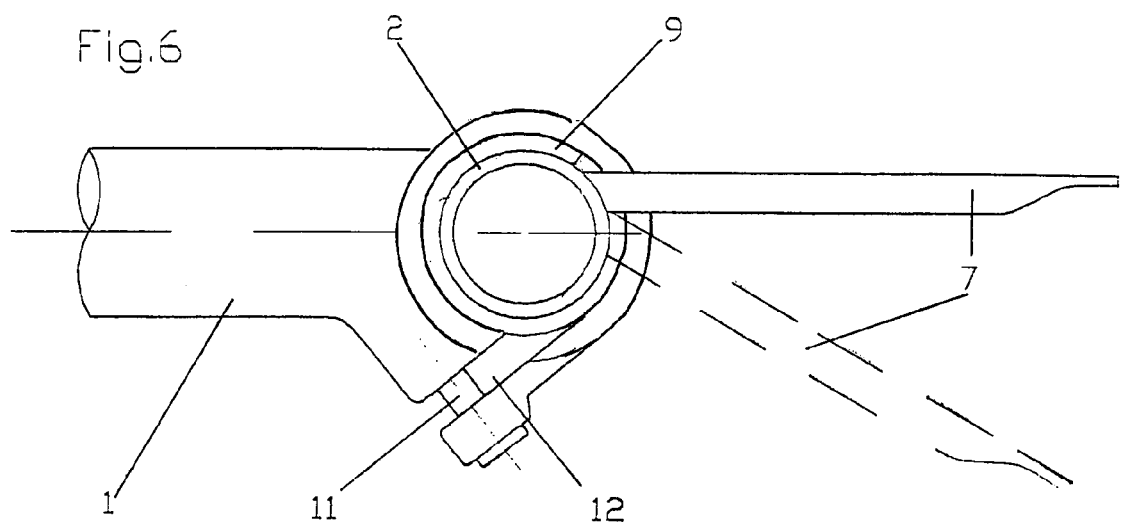
Figure 7:
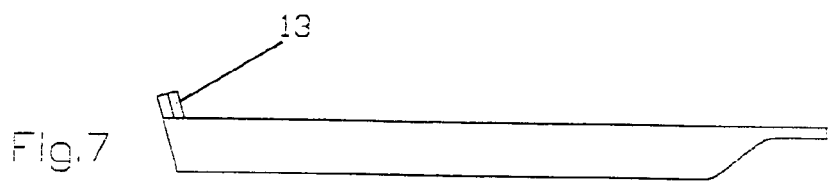
FIG. 7 shows the side view of the central sprag with the perpendicular right element (13).
Figure 8:
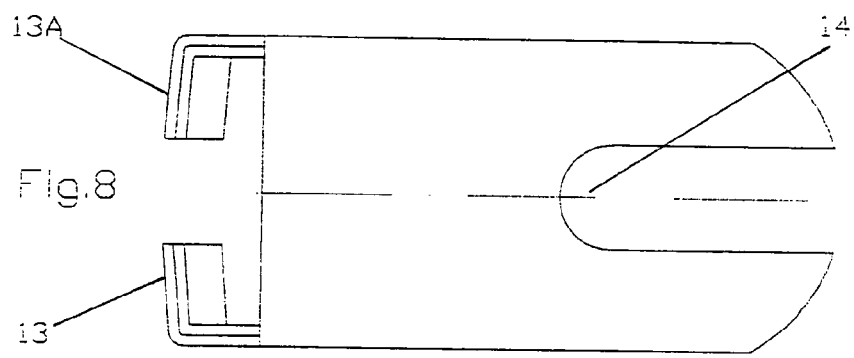
FIG. 8 shows the top view of the central sprag with the buttonhole (14) where the central mobile element fits, and the two perpendicular elements (13, 13A) that fit into the hollow spaces of the large part of the handlebar.
Figure 9:
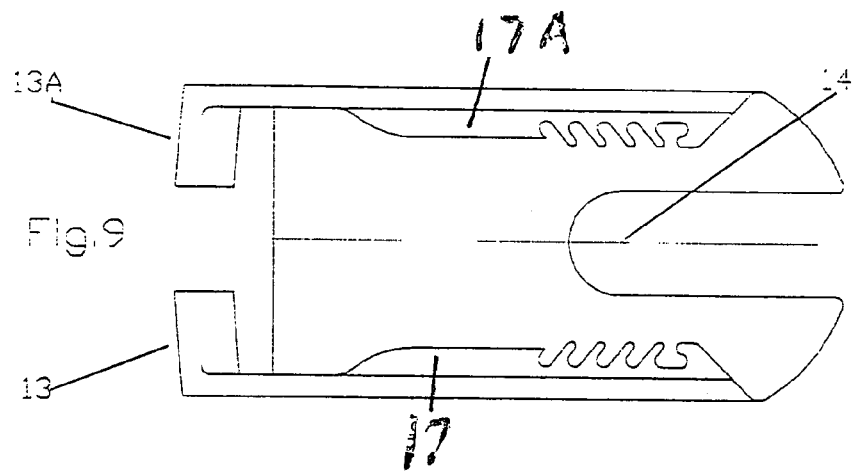
FIGS. 9, 10 and 11 show the bottom, rear and front views of the central sprag with the buttonhole (14) for the central mobile element, the two perpendicular elements (13, 13A) for the locking on the handlebar, and the two horizontal flaps (17, 17A) with symmetrical diagonal cuts where the ends of the spring, set to automatically cover the gaps of the cable, fit; said flaps, in the portion near the handlebar, gradually approach the side faces (16, 16A) of the sprag, doubling its thickness in the area of the two perpendicular elements (13, 13A) as shown by sloped surfaces (18, 18A).
Figure 10:
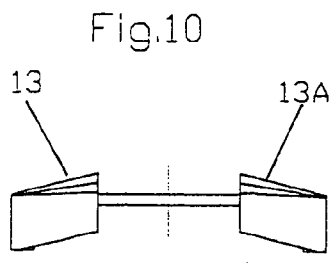
Figure 11:
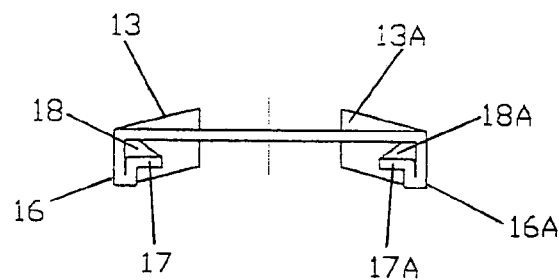
Figure 12:
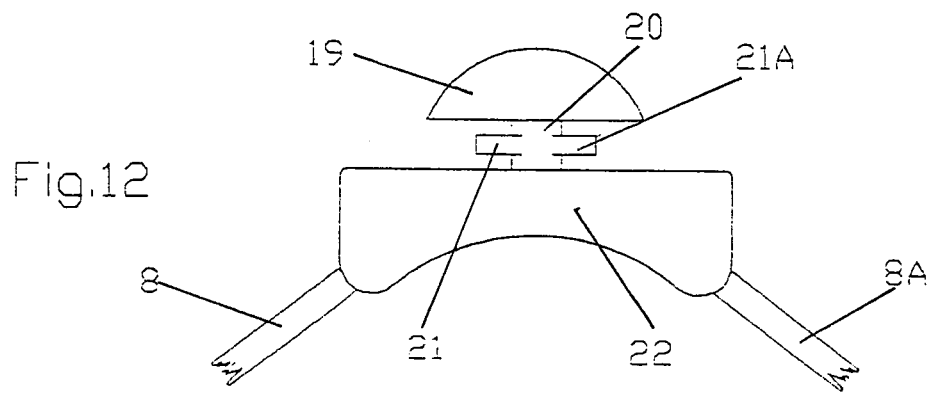
FIGS. 12, 13 and 14 are respectively the front, top and side views of the central mobile element, showing in particular: an upper semi-spherical surface having a hold and cover function, set to hold the logo of the manufacturer of this new system; the central pivot (20) with the two projecting elements (21, 21A) that, according to the rotation degree, get in touch with the spring for the automatic covering of the gaps; a lower portion where the prefixed length and direction boots (8, 8A) are blocked.
Figure 13:
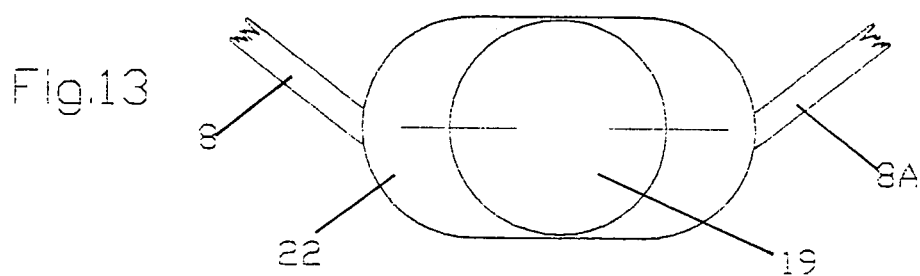
Figure 14:
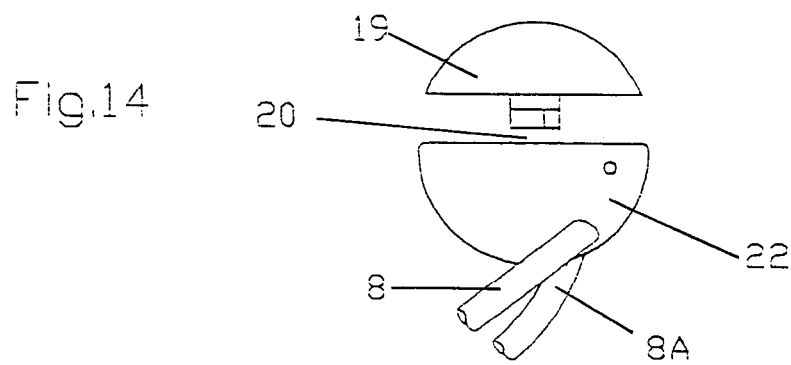
Figures 15, 16, 17:
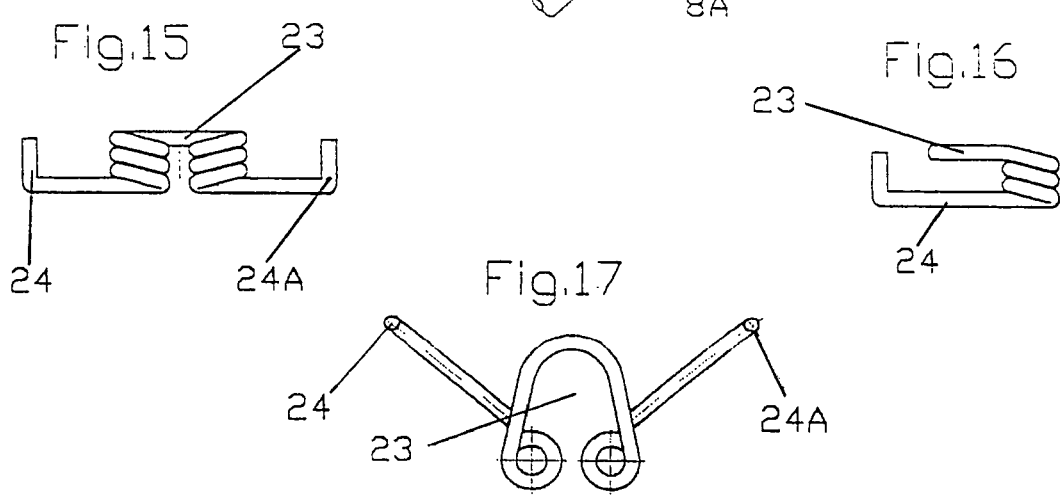
FIGS. 15, 16 and 17 show the particular shape of the spring by front (FIG. 15), side (FIG. 16) and top (FIG. 17) view. These views show the twirling axis (23) of the spring set to enter the pivot of the central mobile element. Its suitable length and angle ends fit into the symmetrical cuts of the central sprag, keeping the traction of the flexible cable constant, with the following extensions produced by a prefixed angular rotation of the mobile body.

The present invention principally aims at avoiding these and other drawbacks, by supplying a braking device that, even if it keeps the same conditions in the feature of the end action on the wheel, modifies its activating system, by means of the following manufacturing solution, which is light, cheap and more effective than traditional systems.

This invention essentially consists of a central sprag, connected and perpendicular to the handlebar, projecting towards the front side of the cycle. At the end of the sprag, a terminal is inserted, free in rotation and equipped with two side holes in the lower part through which the flexible metal cable is inserted, which will be connected outside to the common levers activating the front and rear brakes of the vehicle. At the opposite end, on the contrary, the two lugs of the cable will be directly connected to the ends of the knobs of the handlebar, suitably manufactured with a front add-on permitting an easy hold with both hands when driving. The device supporting the sprag, and consequently the mobile body crossed by the cables, is equipped with a screwing system by means of a collar permitting its rotation around the axis of the handlebar, so as to perfectly improve the angular position of the cables compared to the natural position of the hands. The portion of flexible cable placed near the knobs of the handlebar will be covered in material soft enough to guarantee a safe and comfortable hold. By planning the lengths of the flexible cables connected to the front and rear braking devices, activating one of the two cables placed in the front of the knobs of the handlebar, the complementary cable will be similarly pulled by the rotation and consequent draw of the mobile central body, so getting a braking action also on the opposite wheel and ensuring greater efficiency and safety to the braking action.

A basic characteristic of this invention is also the self-regulation or cover of the natural gaps created by the periodical wear and tear of the braking buffers or by the loosening of the various joints existing on current devices. Unfortunately, this regulation nowadays often necessary and must be performed independently both for the front and back circuit.

In addition, this invention is intended to improve both the braking mechanics and their regulation, making them automatic and following the natural wear and tear of their components, which is made possible by a device placed inside the sprag. Such a device is activated by a spring suitably shaped, twirled around a central pivot, axis of the mobile body, whose side ends enter suitable symmetrical holes placed inside the central sprag. The natural wear and tear of the braking terminals will cause the need of a greater shift of the braking cables, which will mechanically involve a greater rotation of the central body. Therefore, the suitable flaps around the pivot, spring axis, will get in touch with the same spring, rotating it up to the point where the end of one of its terminals will shift to the next buttonhole, altering the position of the mobile body compared to the sprag towards the outside, thereby increasing the distance from the previous point. Consequently, extending linearly the distance, the initial traction conditions will be restored.

Reduced to its essential structure and with reference to the figures of the enclosed drawings, a braking system activated by flexible cable controls, comprises:

means to allocate the braking action, by a central sprag (7) connected to the handlebar (2), perpendicular to its axis, which can be angularly regulated, placed in the center and directed to the front, equipped with a buttonhole (14) at one end and with two internal flaps (17, 17A) that are symmetrical relative to the longitudinal axis, on which there is a series of open cuts with such a conformation as to hold the shaped ends (24, 24A) of the spring set to automatically cover the gaps;

means to fix the sprag to the handlebar, by a ring (9) connected to the handlebar (2) centrally locked by screw (11) placed in the middle of the steering shaft (1); said ring having two notches (10, 10A) where the two perpendicular elements (13, 13A) of the sprag (7) enter;

means to connect the two flexible cables (4, 4A) set to the transmission of the braking couple, front and back, by a central mobile body (6) that, inserted in the buttonhole (14) of the central sprag (7) and free in rotation, is symmetrically crossed in the lower part by the two flexible cables with the lugs placed at the ends of the knobs (3, 3A) of the handlebar, and outside guided by a boot (8, 8A) for each cable suitably directed towards the front and rear braking jaws;

means to automatically cover the gaps, by a spring (23) inserted in axis with the central pivot (20) of the mobile body (6), whose ends enter the symmetrical diagonal cuts inside the sprag (7); and means to activate the spring for automatically covering the gaps, by two flaps (21, 21A) tangent to the central axis (20) where the spring is placed, which, beyond a prefixed rotation angle of the mobile body, get in touch with the spring, extending the terminal part (24, 24A) fitted into the diagonal cuts, so permitting the shift to the next notch and increasing the development of the braking circuit in order to restore the right tractions lost because of wear and tear.

Conveniently, in order to protect the principal mechanism of the system, the upper part (19) of the mobile body has a semi-spherical surface set to perform the double function of belt guard and logo space.

Conveniently, in order to make the braking action of the hands on the cable comfortable, some protections (5, 5A) are provided, made of soft material, which cover the cable (4, 4A) near the knobs (3, 3A).

Conveniently, the protections for the fingers are soldered on the cable during its manufacturing process, in order to curb the outpost costs, but it's also possible to use protections of particular shape, in soft, rigid or semi-rigid materials, to be put between the ends of the handlebar, equipped with suitable hooks or rotation pivots, and the cable lugs.

Conveniently, the central sprag is connected to the handlebar by means of the same locking mechanism of the steering shaft on the same handlebar, so simplifying the system and facilitating assembly and dismantling. It's however possible, in the case of particular manufacturing needs, to use other locking systems.

Conveniently, in the central part of the handlebar, there is a hollow part that will hold an end of the central sprag, shaped as to leave a surface large enough to lock the steering shaft.

Conveniently, the sprag can be angularly regulated compared with the horizontal plane of the handlebar, in order to allow an individual approach that makes its use ergonomic and functional even when riders has physical problems.

Conveniently, the same sprag may be used to support other accessories for cycles, such as lights, cycle-computer, spaces for mobile telephones or other, which may be integrated in planning phase in a single block to the handlebar, so reducing number of pieces, weight and therefore costs.

Conveniently, the central sprag is made of steel plate but, in mass production, it's possible to save on the product with stamps, pressure-casting models for plastic materials, etc.

Conveniently, the spring is made in steel piano wire but, according to different conformations with same forces and directions, it's possible to use other elastic materials.

Conveniently, the central mobile element equally allocates the braking onto the two brakes, but, varying the geometry of the system, it's possible either to perform proportional allocations, or to introduce a lock in order to let the braking controls independent, or otherwise to provide a manual regulation of the same allocation.

Conveniently, it's possible to realize a cheap model of this system, avoiding the central mobile element and directly connecting the boots to the central sprag.

Conveniently, the central mobile element integrates the allocating function onto the two braking axis, with an automatic system to cover the gaps, which is performed when during time, due to wear and tear, a greater extension of the manual braking action is necessary, so the mechanism can self-regulate.

Conveniently, it's possible to provide manual regulation systems for the traction of the cables, by placing them directly on the handlebar or in the traditional position of brakes.

Conveniently, the central mobile element may be made of plastic, steel, or share the composition adopting antifriction materials on the friction parts and good resistant materials for the hard working parts.

Conveniently, the boots, already integrated in the device, may be cheaply produced simultaneously by stamping, reducing the assembly times, but there may be also provided some hollow spaces set to hold them.

Conveniently, the upper part of the mobile body has a holding function and, thanks to its shape, is the appropriate space for the logo of the manufacturer.

Conveniently, the boots have, out from the central mobile element, different angulations, in order to reach as more linearly as possible the front and rear braking jaws.

Conveniently, the knobs of the handlebar have the best shape for the lugs of the cables and are made of soft material near the handles and sufficiently rigid material in the terminals receiving the cable.

Conveniently, this invention offers more safety assurance in braking than the current separated systems, reducing, at equivalent speed, the braking space, thanks to the allocation onto both the wheels.

Conveniently, said system makes the vehicle accessible and safer for everyone, and in particular for persons having physical handicaps at the upper limbs.

Conveniently, the safety of this system is further supported by the complete absence of protrusions, points, edges or anything might be dangerous when spilling.

Conveniently, it's possible to use the same functional concept of this invention, varying the mechanical/manual control into hydraulic control, by replacing the central mobile element and the boots with a double hydraulic pump and relative tubes, or placing the pumps below the central mobile element.

Conveniently, this invention may be used, also in single solution, to control devices other than braking, either directly by mechanical solution or, with the necessary changes, with the introduction of a hydraulic pump.

In practice, the manufacturing details may, however, vary as regards shape, size, position of elements, and type of materials used, but still remain within the range of the idea proposed as a solution and, consequently, within the limits of the protection granted by this patent for invention.

The invention claimed is:

1. Braking system activated by flexible cable controls, comprising:
   a central sprag (7) that is connected to a handlebar (2) and that is angularly regulated and equipped with a buttonhole (14) at one end and with two internal symmetrical flaps (17, 17A) on which there are a series of gaps with such a conformation as to hold ends (24, 24A) of a spring that are set to automatically fit into the gaps;
   a ring (9) to fix the sprag to the handlebar and connected to the handlebar (2) by a screw (11) placed in the middle of a steering shaft (1); said ring having two notches (10, 10A) where two perpendicular elements (13, 13A) of the sprag (7) enter;
   a central mobile body (6) that is connected to two flexible cables (4, 4A) that transmit respective braking couples, front and back, the central mobile body (6) being inserted in the buttonhole (14) of the central sprag (7) and free in rotation, and symmetrically crossed by the two flexible cables;
   the spring (23) being inserted about a central axis (20) of the mobile body (6) and having ends that enter the gaps inside the sprag (7); and
   two flaps (21, 21A) tangent to the central axis (20) where the spring is placed, and which, beyond a prefixed rotation angle of the mobile body, touch the spring, extending the ends (24, 24A) fitted into the gaps, so permitting a shift to a next gap to restore traction lost because of wear and tear.

2. System as claimed in claim 1, wherein an upper part (19) of the mobile body has a semi-spherical surface set to perform the double function of belt guard and logo space.

3. System as claimed in claim 1, further comprising protections (5, 5A) which cover the cables (4, 4A).

4. System as claimed in claim 1, wherein the central sprag is connected to the handlebar by means of a same locking mechanism of the steering shaft on the same handlebar.

5. System as claimed in claim 1, wherein a central part of the handlebar comprises a hollow part that holds an end of the central sprag, shaped as to leave a surface large enough to lock the steering shaft.

6. System as claimed in claim 1, wherein the sprag is angularly regulated compared with the horizontal plane of the handlebar.

7. System as claimed in claim 1, wherein the central sprag is made of steel plate or with stamps, pressure-casting models for plastic materials, while the spring is made in steel piano wire.

8. System as claimed in claim 1, wherein the central mobile element proportionally allocates braking to two brakes.

9. System as claimed in claim 1, wherein the central mobile element equally allocates braking onto two brakes.

10. System as claimed in claim 1, wherein the central mobile element is made of one of plastic and steel.

* * * * *